US009117202B2

(12) United States Patent
Close et al.

(10) Patent No.: US 9,117,202 B2
(45) Date of Patent: Aug. 25, 2015

(54) IDENTIFYING AND DISPLAYING MESSAGES CONTAINING AN IDENTIFIER

(75) Inventors: Tyler Close, Menlo Park, CA (US); John Recker, Mountain View, CA (US); Craig Sayers, Menlo Park, CA (US); Ian N Robinson, Pebble Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1814 days.

(21) Appl. No.: 12/254,979

(22) Filed: Oct. 21, 2008

(65) Prior Publication Data

US 2009/0112720 A1  Apr. 30, 2009

Related U.S. Application Data

(60) Provisional application No. 60/984,219, filed on Oct. 31, 2007.

(51) Int. Cl.
 *G06Q 30/00* (2012.01)
 *G06Q 10/10* (2012.01)
 *G06Q 30/02* (2012.01)

(52) U.S. Cl.
 CPC .......... *G06Q 10/107* (2013.01); *G06Q 30/0225* (2013.01)

(58) Field of Classification Search
 CPC ..................................... G06Q 10/107
 USPC .......................... 715/206, 201, 205
 See application file for complete search history.

(56) References Cited

U.S. PATENT DOCUMENTS

| | | | | |
|---|---|---|---|---|
| 6,009,442 A | * | 12/1999 | Chen et al. | 715/205 |
| 6,101,510 A | * | 8/2000 | Stone et al. | 715/234 |
| 6,223,213 B1 | * | 4/2001 | Cleron et al. | 709/206 |
| 6,351,755 B1 | * | 2/2002 | Najork et al. | 715/206 |
| 7,478,089 B2 | * | 1/2009 | Henkin et al. | 1/1 |
| 7,814,419 B2 | * | 10/2010 | Fabritius | 715/702 |
| 2005/0198268 A1 | * | 9/2005 | Chandra | 709/224 |
| 2006/0123087 A1 | * | 6/2006 | Gibson | 709/206 |

OTHER PUBLICATIONS

Google.pedia: The Ultimate Google Resource, Michael Miller Jul. 11, 2006.*
A Multi-Ontology Approach for Personal Information Management (Xiao) presented in Nov. of 2005 at the First International Workshop on the Desktop in Galway Ireland.*
Fast, Flexible Filtering with Phlat—Personal Search and Organization Made Easy by Edward Cutrell, Microsoft Apr. 22, 2006.*

(Continued)

*Primary Examiner* — William Bashore
*Assistant Examiner* — Nathan Shrewsbury
(74) *Attorney, Agent, or Firm* — Mannava & Kang, P.C.

(57) ABSTRACT

In a computerized method of identifying and displaying messages containing an identifier, where the messages are privately stored for restricted access by a user, the identifier of a document displayed in a navigation area result window is identified. In addition, the message store is scanned to identify messages containing the identifier and the messages identified as containing the identifier are displayed in a messaging area window.

20 Claims, 6 Drawing Sheets

(56) References Cited

OTHER PUBLICATIONS

Rhodes, Bradley J—"Margain Notes Building a Contextually Aware Associative Memory"—Proceedings of the International Conference on Intelligent User Interfaces (IUI '00)—Jan. 2000—pp. 1-10.

Rhodes, Bradley J et al—"Remembrance Agent—a continuously running automated information retrieval system"—Proceedings of the first international Conference on The Practical Application of Intelligent Agents and Multi Agent Technology (PAAM '96)—pp. 487-495.

* cited by examiner

IDENTIFYING AND DISPLAYING MESSAGES CONTAINING AN IDENTIFIER

CROSS-REFERENCE TO RELATED APPLICATION

The present application claims priority from the provisional application Ser. No. 60/984,219, filed Oct. 31, 2007, the contents of which are incorporated herein by reference in their entirety.

BACKGROUND

Electronic mail (e-mail) and other types of computerized communication tools have ever-increasingly become effective means by which users communicate with each other. In fact, it is now commonplace for users to receive dozens of e-mails in one or more e-mail accounts every day ranging among a variety of different topics. As such, a user's inbox quickly becomes filled with numerous e-mails and thus becomes difficult to manage.

A common attempt at overcoming the difficulty in managing the e-mails is for the user to organize e-mails into a number of different folders. This requires that the user sort through the e-mails and place the e-mails into the appropriate folders, which is both time-consuming and laborious. This approach may be effective for those e-mails that pertain to a specific topic having a relatively long-period of relevance, and can thus easily be sorted into the different folders. However, if an e-mail is relevant to more than one topic and is thus suitable for insertion into multiple folders, the user may find it difficult to determine which of the folders that e-mail is to be inserted. In addition, if the user receives a number of e-mails pertaining to a number of different topics, each having a relatively short period of relevance, the user will be required to create a relatively large number of new folders for each of the different topics, which is a relatively cumbersome task.

It would therefore be desirable to be able to quickly and efficiently identify which e-mails are relevant to a particular topic without requiring the time consuming and laborious sorting operations currently being performed to manage e-mails.

BRIEF DESCRIPTION OF THE DRAWINGS

Features of the present invention will become apparent to those skilled in the art from the following description with reference to the figures, in which.

DETAILED DESCRIPTION

Figure 1:
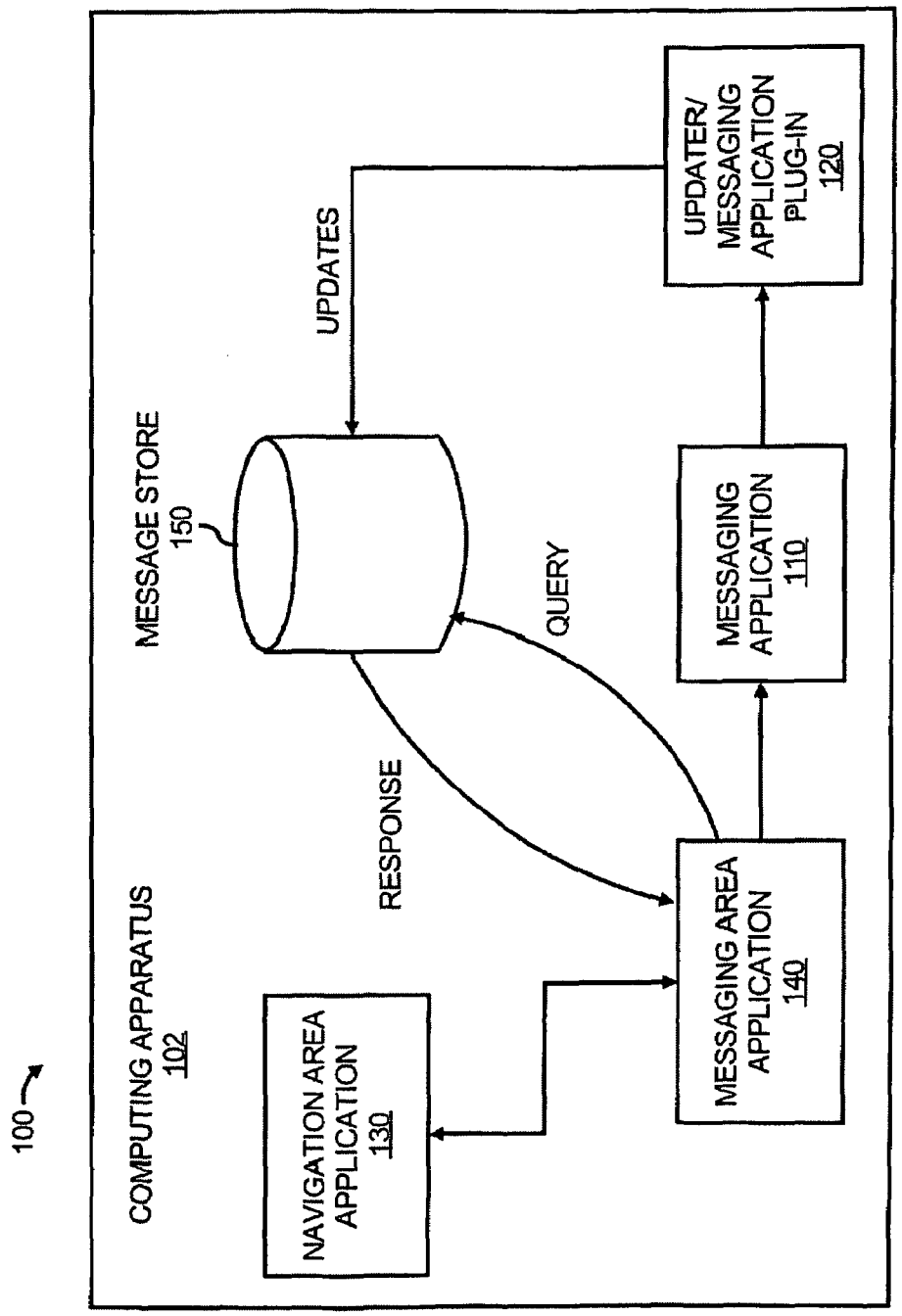
FIG. 1 shows a simplified block diagram of a system for identifying and displaying messages privately stored for restricted access by a user that are relevant to a document displayed on a browser of the user's computing apparatus, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are methods and systems for automatically identifying and displaying messages associated with a document of interest to a user. Also disclosed herein are systems and methods for manipulating the messages displayed to the user in a variety of different manners. Generally speaking, in the systems and methods disclosed herein, one or more identifiers of a document displayed in a navigation area of a browser are automatically discovered. The one or more identifiers may comprise identifiers recited in an address line of a browser, identifiers of results displayed in the document, and associated identifiers, such as those found while following a redirection chain. In addition, messages stored in a message store containing the one or more identifiers are automatically identified and displayed to the user. In one regard, therefore, the methods and systems disclosed herein may be implemented as an organizational tool that automatically identifies and displays messages relevant to a particular topic of interest to the user.

According to various examples disclosed herein below, the messages are e-mail or other electronic messages and the message store is private to the user. The message store may thus be located on the user's computing apparatus and thus accessible by the user only. In addition, or alternatively, the message store may be stored remotely with access to the message store restricted to the user. This "private" arrangement provides for a number of benefits in terms of also implementing the systems and methods disclosed herein as a collaboration tool. In one respect, because the messages comprise e-mail messages, which may be communicated through existing e-mail messaging systems, the messages are communicated from one user to another or by a user to be stored in the message store, while following the security and legal conformance policies of the e-mail application and those policies set forth by individual organizations. In addition, users are able to select the intended recipients of the messages, and thus may substantially control access to individual messages, as well as to substantially control who may contribute to the collaboration. In one regard, collaboration among the users is facilitated through communication and automatic organization of the messages to the intended recipients.

One benefit of including the message store locally on the users computing apparatus is that it enables a user to read and write messages offline. In addition, either of the private arrangements discussed above enables the message store to have a higher level of security since the information contained therein is not shared among a number of users.

With reference first to FIG. 1, there is shown a simplified block diagram of a system 100 for identifying and displaying messages privately stored for restricted access by a user that are relevant to a document displayed on a browser of the user's computing apparatus, according to an example. It should be understood that the system 100 may include additional components and that some of the components described herein may be removed and/or modified without departing from the scope of the system 100. For instance, the system 100 may include any number of additional applications or software configured to perform any number of other functions.

Generally speaking, the system 100 includes a plurality of applications that may be stored on a computer readable storage medium. The computer readable storage medium may comprise computer system RAM, ROM, EPROM, EEPROM, and removable computer readable storage media, such as, magnetic disks, optical disks, tapes, etc. As such, the computer readable storage medium may comprise a storage device or memory of the user's computing apparatus 102 or it may comprise a removable storage device having applications stored thereon configured to be executed in the user's computing apparatus 102. The user's computing apparatus 102 may comprise, for instance, a desktop computer, a laptop computer, a tablet PC, a personal digital assistant, a cellular telephone, etc. In this regard, one or more processors of the user's computing apparatus 102, may execute or implement the applications contained in the system 100.

As shown, the system 100 includes a messaging application 110, an updater/messaging application plug-in 120, a navigation area (NA) application 130, a messaging area application 140, and a message store 150. The messaging application 110 generally comprises any reasonably suitable application that enables communication over a network, such as, an intranet, the Internet, etc., through the user's computing apparatus 102, for instance, an e-mail application, a chat messaging application, a text messaging application, etc.

The updater/messaging application plug-in 120 generally comprises a plug-in of the messaging application 110. The updater/messaging application plug-in 120 is configured to monitor all of the messages that are received and generated by the messaging application 110. The updater/messaging application plug-in 120 is also configured to update the messages stored in the message store 150.

The navigation area application 130 generally comprises any reasonably suitable application that enables a user to access a network through the user's computing apparatus 102. In this regard, the navigation area application 130 may comprise, for instance, a web browser, a file browser, etc. In addition, the navigation area application 130 is configured to display a browser window on the user's computing apparatus 102 of the user's interaction with programs or files in a web browser, a file browser, etc. The file browser may enable the user to browse through files stored locally on the user's computing apparatus 102 or through files stored externally, for instance, on a shared server.

Figure 2:
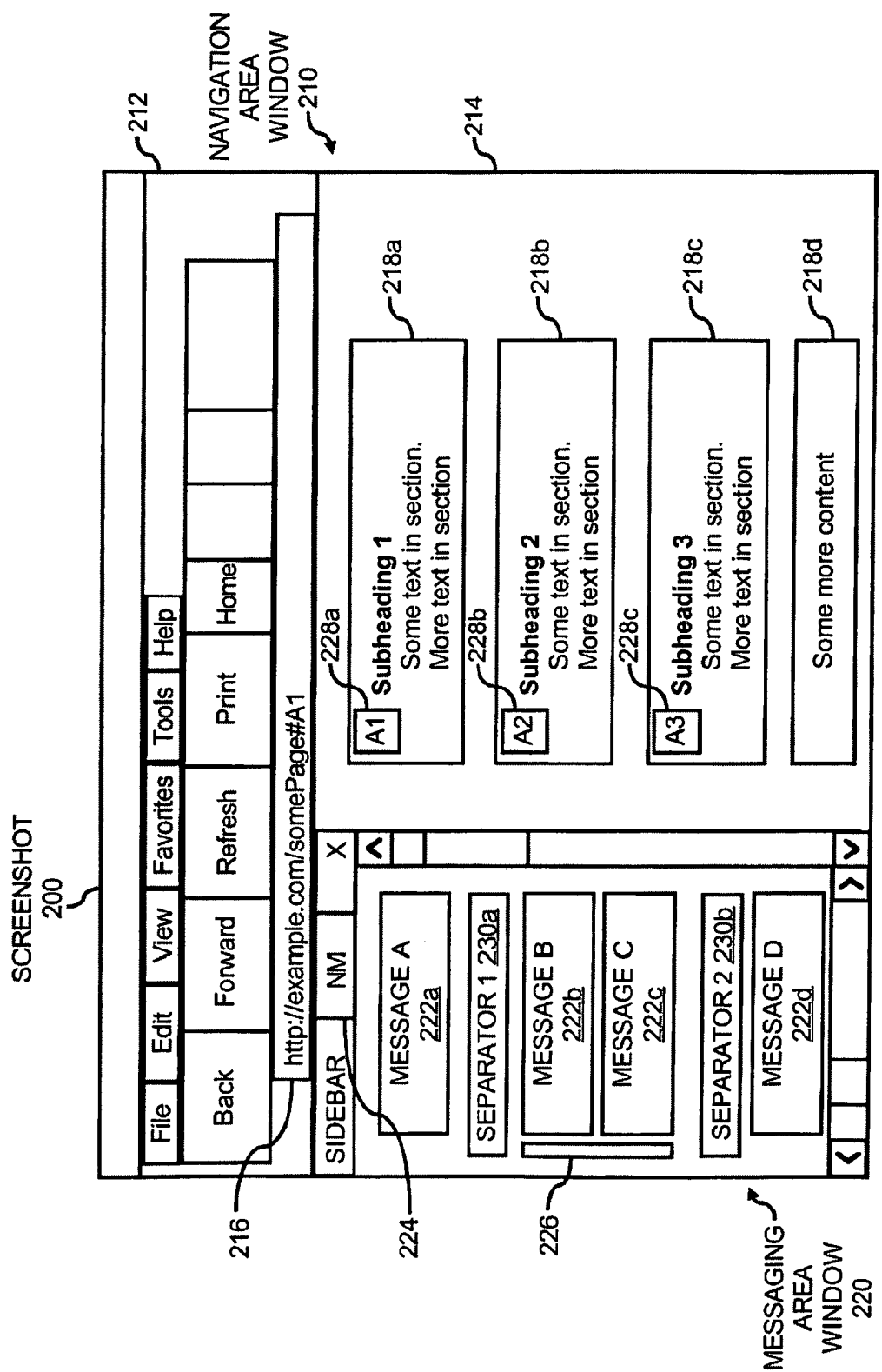
FIG. 2 illustrates a screenshot of a navigation area window and a messaging area window, according to an embodiment of the invention.

The messaging area application 140 may comprise a plug-in of the navigation area application 130. The messaging area application 140 is generally configured to monitor the user's activity in a result window 214 of a navigation area window 210 (FIG. 2). For instance, the messaging area application 140 is configured to identify one or more identifiers of the programs or files that the user accesses in the navigation area result window 214. The one or more identifiers may include a unique identifier of the document or an object contained in the document displayed in the navigation area result window 214. The unique identifier may comprise, for instance, a. Uniform Resource Identifier (URI), a Uniform Resource Locator (URL), a Uniform Resource Name (URN), or other machine-readable identifier, such as, a patent number, an ISBN, etc. Although particular reference is made to "documents" throughout the present disclosure, it should be understood that the term "documents" also include web pages, folders, or other types of electronic media that may be displayed in the navigation area result window 214.

The messaging area application 140 is also configured to perform queries in the message store 150 to identify those messages relating to the one or more identifiers of the document or section of the document displayed in the navigation area window. The messaging area application 140 is, for instance, configured to identify those messages containing the same one or more identifiers as the document or section of the document displayed in the navigation area result window 214. By way of example, the messaging area application 140 is configured to identify those messages containing the same URLs as the URL of the document displayed in the navigation area result window 214.

The messaging area application 140 is further configured to display a messaging area window 220 (FIG. 2) on the user's computing apparatus 102. According to an example, the messaging area application 140 is configured to display the results of the query of the message store 150 in the messaging area window 220. The messaging area application 140 may further format the results of the query displayed in the messaging area window 220.

The message store 150 comprises a database that is private to a particular user. As shown in FIG. 1, the message store 150 may be locally stored in the user's computing apparatus 102. Alternatively, however, the message store 150 may be stored remotely from the computing apparatus 102. In this instance, access to the message store 150 may be restricted to the user through any conventional means, such as, through password protection. Also in this example, the messaging application 110 (and/or the updater/messaging application plug-in) may also be remotely located from the computing apparatus 102, such as, with web-based email applications.

In any event, the message store 150 may store an index of the messages and/or the messages themselves transmitted to and from the messaging application 110. The updater/messaging application plug-in 120 may update the messages stored in the message store 150 as the messages are modified in the messaging application 110. Alternatively, the updater/messaging application plug-in 120 may create an index of all of the messages that are transmitted to and from the messaging application 110 and may store the index in the message store 150. According to an example, the messages may be indexed according to the identifiers, such as, URIs, contained in the messages. In addition, the updater/messaging application plug-in 120 may update the index of the messages contained in the message store 150 as new messages are transmitted from and received by the messaging application 110. Moreover, the updater/messaging application plug-in 120 may update messages in the index if they are touched, modified, or moved by the messaging application 110, and may remove messages from the index in response to those messages being deleted by the messaging application 110.

The messaging area application 140 is also configured to receive user commands. One of the commands may comprise an instruction to create a new message. In response to receipt of this instruction, the messaging area application 140 may access the messaging application 110 to open a new message window on a display of the computing apparatus 102, which the user may use to create the new message. By way of example, the new message window may comprise a new e-mail message, a reply to an e-mail message, a forwarding e-mail, etc. As described in greater detail herein below, the messaging area application 140 is configured to pre-populate the new message window with the URI of the current document in a navigation area result window 214 (FIG. 2).

With particular reference now to FIG. 2, there is shown a screenshot 200 of a navigation area window 210 and a messaging area window 220, according to an example. As shown in FIG. 2, the navigation area window 210 may comprise a web browser, such as, INTERNET EXPLORER, MOZILLA FIREFOX, or other type of web browser. In addition, or alternatively, the navigation area application 130 may comprise a file browser, such as, WINDOWS EXPLORER, or other type of file browser. In either case, the messaging area window 220 may comprise a sidebar in the navigation area window 210.

The navigation area window 210 is depicted as including a heading section 212 and a result window 214. As found in conventional web browser and file browser interfaces, the heading section 212 may include a plurality of buttons that, when selected, cause the web browser or file browser to perform any of a number of different common tasks, such as, printing, moving forward or backwards through different files, etc. In addition, the heading section 212 is depicted as including a text box 216 for receiving input from a user, such as, a URL address or a file name. The text box 216 may also display the URI of the document being displayed inside in the result window 214.

The messaging area window 220 is depicted as displaying a plurality of messages 222a-222d. The messages 222a-222d may comprise, for instance, those messages identified by the messaging area application 140 as including one or more of the identifiers of the document displayed in the result section 214. The one or more identifiers may comprise identifiers recited in an address line of a browser, identifiers of results displayed in the document, and associated identifiers, such as those found while following a redirection chain. In addition, the messages 222a-222d may be sorted in the messaging area window 220 in any of a variety of different manners, such as, by date, by name, by relevance to the one or more identifiers, etc.

Various manners in which the components of the system 100 depicted in FIG. 1 may be implemented are described with respect to the following figures. In addition, the following figures are described with respect to the screenshot 200 depicted in FIG. 2. It should, however, be understood that the methods described with respect to the following figures may be performed with respect to navigation area windows and messaging area windows having configurations that differ from those depicted in FIG. 2, without departing from the scopes of the following methods. It should also be apparent to those of ordinary skill in the art that the methods discussed below represent generalized illustrations and that other steps may be added or existing steps may be removed, modified or rearranged without departing from the respective scopes of the methods.

Browsing

Figure 3:
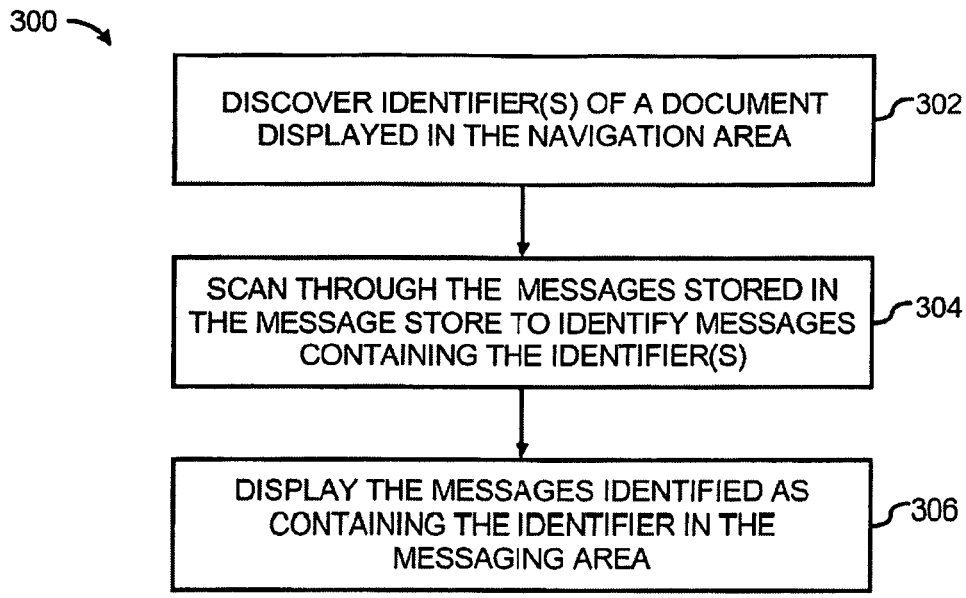
FIG. 3 illustrates a flow diagram of a method of automatically displaying messages stored on a user's computing apparatus, according to an embodiment of the invention.

With reference first to FIG. 3, there is shown a flow diagram of a method 300 of automatically displaying messages stored on a user's computing apparatus 102, according to an example. Generally speaking, one or more of the processors contained in the user's computing apparatus 102 may implement or execute the method 300 to automatically identify and display messages relevant to a document that has been identified as being of interest to the user. For instance, the document that is currently being displayed on a navigation area window 210 may be considered as being of interest to the user.

At step 302, one or more identifiers of the document displayed in a navigation area result window 214 may be discovered. As described above, the one or more identifiers may comprise, for instance, URIs, URLs, URNs, or other types of unique identifiers, such as, patent numbers, ISBNs, etc. The one or more identifiers may be discovered by scanning through the navigation area window 210 to locate the one or more identifiers. By way of example, an identifier may be located in the text box 216, in which case, the identifier may comprise the URI recited in the text box 216. As another example, the identifier may be located within the result window 214, in which case, the identifier may comprise a hypertext link. As a further example, the one or more identifiers may comprise one or more identifiers found during a redirection chain.

In any regard, at step 304, the messaging area application 140 may use the discovered one or more identifiers in scanning through the messages stored in the message store 150. More particularly, the messaging area application 140 may scan through the message store 150 to identify those messages that contain the one or more identifiers discovered at step 302. In addition, or alternatively, if an index of messages was created, the messaging area application 140 may identify those messages that contain the one or more identifiers by scanning through the index of messages, which may be stored in the message store 150.

At step 306, the messaging area application 140 may display the messages identified at step 304 as containing the one or more identifiers in the messaging area window 220. The messaging area application 140 may display links to the actual messages in the messaging area window 220. The links may recite, for instance, summaries of the messages, text from the subjects of the messages, author and/or recipient information, the date when the message was either received or sent, etc. As such, a user may select one or more of the links to the messages 222a-222d in order to view the entire text of those messages 222a-222d.

As an alternative to the links to the messages, the messages 222a-222d may comprise reduced versions of the actual messages. The reduced versions may be displayed as, for instance, the heading information from the messages 222a-222d, the portions of the messages 222a-222d that recite the identifier, etc.

By way of a particular example, in the event that the identifier comprises the URL of the document or an object 218a contained in the document being displayed in the navigation area result window 214, the messaging area application 140 may automatically discover that URL and may automatically display all of the messages (or links to those message) stored in the message store 150 that contain that URL. In this regard, all of the messages deemed to be relevant to the document being displayed in the navigation area result window 214 are automatically displayed to the user in the messaging area window 220.

As such, the system 100 may be implemented as an effective collaboration tool because the system 100 enables users to quickly identify all of the messages that have been received from or sent to other users that contain the identifier(s). In addition, the messages may be arranged in reverse chronological order to enabled users to identify which of the messages are the most current.

According to another example, the messages 222a-222d displayed in the messaging area window 220 may comprise the most recent messages in respective message threads. In this regard, the messaging area application 140 is configured to identify which message of a plurality of messages along a common thread, for instance, those messages containing the same identifier(s), is the most recent and to display that message instead of all of the messages along the common thread. In addition, the messaging area application 140 is configured to tag the messages identified as not being the most recent as having been replaced by the most recent message. As such, if a user comes across a message that is not the most recent in a particular thread, that message will notify the user that one or more recent messages are available.

As a yet further example, the messaging area application 140 may track the identifiers, such as, the URLs of web pages in a chain that follows a redirection operation. In this example, the messaging area application 140 may locate all of the messages 222a-222d containing the URLs in the redirect chain and may display those messages 222a-222d in the messaging area window 220.

In addition, or alternatively, one or more object 218a-218d contained in the navigation area result window 214 may have their own respective identifiers. The identifiers may comprise URIs, URLs, patent numbers, serial numbers, or other forms of uniquely identifying the various objects 218a-218d, such as, a hypertext link. In addition, if the document includes temporally varying content, such as a video, then each time segment may also be identified with its own respective identifier.

A standard way to identify individual parts of a larger document is to construct an identifier by taking the identifier for the document and appending a hash sign followed by a local identifier for a fragment of the document. In HTML documents those fragments within the document can be labeled with anchor tags 228a-228c. The messaging area application 140 may display either or both of the messages 222a-222d, identified as containing the document identifier and the messages 222b-222d containing the fragment identifiers corresponding to one or more of the anchor tags 228a-228c in objects 218a-218c. In instances where the messaging area application 140 displays messages 222a-222d containing the fragment identifiers of a plurality of objects 218a-218c, the messaging area application 140 may also display an indicator 226 that identifies which of the messages 222a-222d currently being displayed in the messaging area 220 contains the fragment identifier of an object that is currently of interest. In addition, or alternatively, the messaging area application 140 may sort the messages 222a-222d according to the fragment identifiers contained in the messages 222a-222d.

The messaging area window 220 may also include visual separators 230a-230b between messages about different objects. Each separator 230a-230b may link to the corresponding fragment identifier. For example, the separator 230a may link to anchor tag 228a, while separator 230b may link to anchor tag, 228c. By way of example, if the user selected the "separator 230b" in the messaging area window 220, and it linked to the anchor tag 228c, then the navigation area window 210 would update to show the selected object 218c, the URL window 216 would be updated with the appropriate fragment identifier from the anchor tag 228c, and the highlight 226 would move next to message 222d.

According to an example, the fragment identifiers need not be contained within the document. By way of a particular example, each segment of a video being played in the navigation area window 210 may have its own respective fragment identifier. In this example, as the video is played, the sections, and thus, the fragment identifier changes. In response to the fragment identifier changes, the messaging area application 140 highlights messages containing the different fragment identifiers with the indicator 226 in the messaging area window 220. In addition, or alternatively, the messaging area application 140 may actively vary the messages 222a-222d displayed, such that, only those messages 222a-222d containing the current fragment identifier are displayed concurrently with the respective video sections.

According to a further example, the messaging area application 140 may display documents associated with identifiers contained in the messages 222a-222d. In this example, a user may select an identifier, which may comprise a hypertext link, in a message 222a and the messaging area application 140 may cause the document associated with the identifier to be displayed in the navigation area window 210.

Adding Messages—Security Measures

Figure 4:
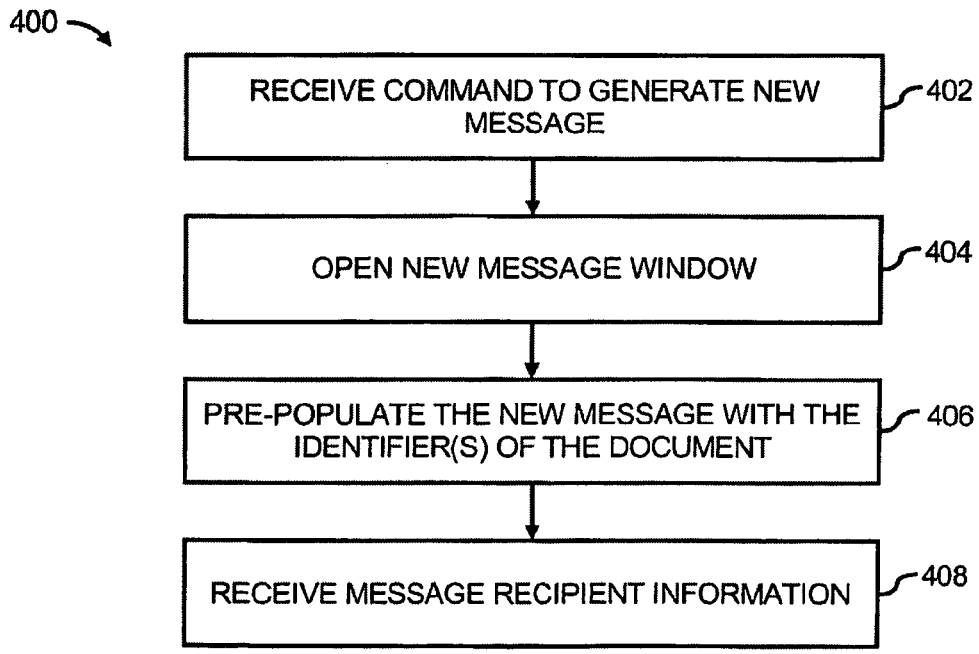
FIG. 4 shows a flow diagram of a method of automatically adding a message that is relevant to a document or a section thereof currently being displayed in the navigation area window, according to an embodiment of the invention.

With reference now to FIG. 4, there is shown a flow diagram of a method 400 of automatically adding a message that is relevant to a document or a section thereof, currently being displayed in the navigation area result window 214, according to an example. The one or more processors contained in the user's computing apparatus 102 may implement the method 400 to automatically create a new message that is relevant to the document or a section thereof, and to automatically ensure that the message retains an adequate level of security.

At step 402, the messaging area application 140 receives a command to generate a new message. The messaging area application 140 may receive the command to generate the new message through detection of a user's selection of a new message (NM) button in the messaging area window 220. As another example, the messaging area application 140 may receive a command to generate the new message through detection of a user's selection of, for instance, a "Reply," a "Reply to All," or a "Forward" button on an existing message.

In any regard, the messaging area application 140 causes the messaging application 110 to open a new message window at step 404. In addition, the messaging area application 140 causes the messaging application 110 to pre-populate the new message with one or more of the identifiers relating to the document displayed in the navigation area result window 214, as indicated at step 406. The messaging area application 140 may causes the messaging application 110 to include the one or more identifiers in the main body of the new message, in a subject line of the new message, or as meta-data embedded within the message.

At step 408, the messaging application 110 receives identification of the one or more intended recipients of the new message from the user. By reciting the intended recipients of the new message, the new message may be transmitted in a relatively secure manner because it is sent only to those intended recipients and because the new message is transmitted with the security protocols of the messaging application 110.

Editing Messages

Figure 5:
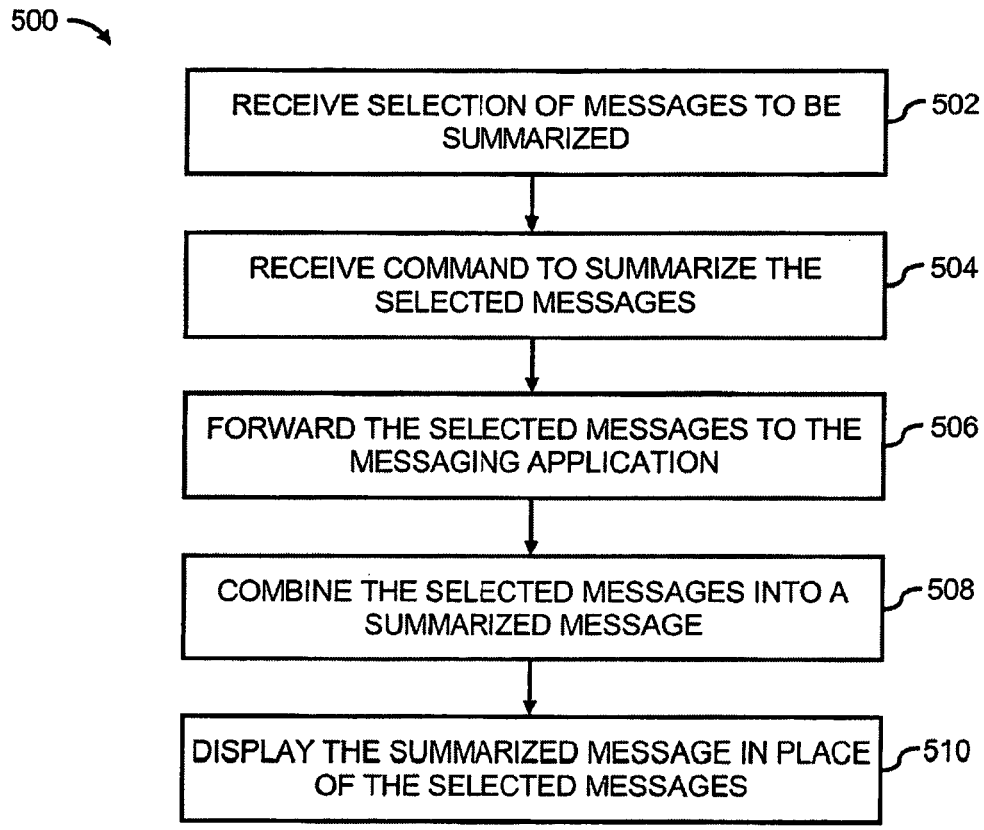
FIG. 5 shows a flow diagram of a method of editing the messages displayed in the messaging area window, according to an embodiment of the invention.

With reference now to FIG. 5, there is shown a flow diagram of a method 500 of editing the messages 222a-222d displayed in the messaging area window 220; according to an example. The one or more processors contained in the user's computing apparatus 102 may implement the method 500 to automatically edit one or more of the messages 222a-222d.

More particularly, the method 500 may be implemented or executed to summarize a plurality of messages into a single summarized message.

At step 502, the messaging area application 140 may receive messages 222a-222d selected by a user to be summarized. In addition, the messaging area application 140 may receive a command to summarize the selected messages 222a-222d, at step 504. By way of example, the user may select the messages 222a-222d to be summarized by highlighting the messages 222a-222d desired to be summarized in the messaging area window 220 and by instructing the messaging area application 140 to summarize those highlighted messages 222a-222d.

At step 506, the messaging area application 140 may forward the messages to be summarized to the messaging application 110. In addition, the messaging application 110 may combine the selected messages into a summarized message, for instance, message A 222a, at step 508. The summarized message 222a may comprise, for instance, an e-mail having an indication that the e-mail summarizes the selected messages. The summarized message 222a may also include a user-created summary of the selected messages. The updater/messaging application plug-in 120 may note the message being added to the message store 150 and may update the message store 150. In addition, the messaging area application 140 may identify the summarized message in the message store 150 and may update the display in the messaging area window 220 to include the summarized message, as indicated at step 510.

By way of example, the summarized message 222a may include a heading that recites the particular messages being summarized by that summarized message 222a, in human readable form. As another example, the summarized message 222a may include meta information, which indicates the messages being summarized in the summarized message 222a.

In any regard, according to an example, copies of the messages being summarized by the summarized message 222a may be included, such as, as attachments to the summarized message 222a. In another example, the text of the messages being summarized may be included in the summarized message 222a, for instance, in reverse chronological order.

At step 508, the messaging area application 140 may display the summarized message 222a in the messaging area window 220. In addition, the messaging area application 140 may remove the messages that have been summarized into the summarized message 222a from the messaging area window 220.

Small Screen Devices

Figure 6:
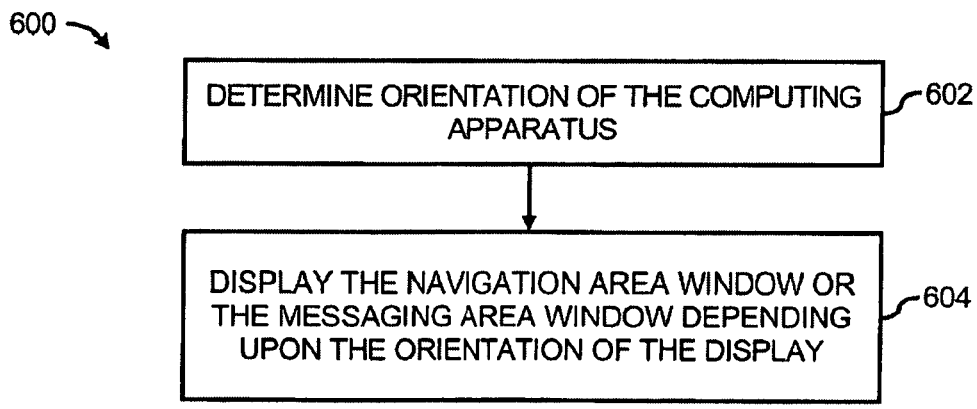
FIG. 6 shows a flow diagram of a method of displaying the navigation area window and the messaging area window on a computing apparatus having a relatively small display, according to an embodiment of the invention.

Turning now to FIG. 6, there is shown a flow diagram of a method 600 of displaying the navigation area window 210 and the messaging area window 220 on a computing apparatus 102 having a relatively small display, according to an example. More particularly, the one or more processors may implement or execute the method 600 to vary the content displayed on the display depending upon the orientation of a computing apparatus 102 having a relatively small display, such as, a handheld personal computer, a portable digital assistant, a cellular telephone, or other web-enabled device.

At step 602, the orientation of the computing apparatus 102 is determined. According to an example, the computing apparatus 102 includes one or more sensors configured to detect the orientation of the computing apparatus 102. The one or more sensors may comprise any reasonably suitable known mechanism for determining the orientation of the computing apparatus 102. By way of example, the one or more sensors may comprise accelerometers, optical devices, etc.

In addition, at step 604, the messaging area application 140 displays the navigation area window 210 or the messaging area window 220 on the display of the computing apparatus 102 based upon the detected orientation of the computing apparatus 102. More particularly, for instance, the messaging area application 140 may display the navigation area window 210 (or the navigation area result window 214) when the computing apparatus 102 is in the first orientation and may display the messaging area window 220 when the computing apparatus 102 is in the second orientation. By way of example, the messaging area application 140 may display the navigation area window 210 (or the navigation area result window 214) when the display of the computing apparatus 102 is in a portrait orientation and may display the messaging area window 220 when the display of the computing apparatus 102 is in a landscape orientation.

Machine Readable Data

Additional machine-readable information may be embedded in documents and used to enhance the display in messaging area window 220. For example, web pages could include an identifier for a recommended style sheet to be used when displaying messages in the messaging area window 220.

Expanded Search

In addition to searching the message store 150, the messaging area application 140 may be configured to search for messages containing the one or more identifiers in other content repositories. The other content repositories may be stored, for instance, locally on the user's computing apparatus 102, in a shared intranet file system, mailing list repositories, or in servers accessible over the Internet. By way of example, a user may provide the messaging area application 140 with a list of favorite blogs and the messaging area application 140 may also search through those blogs to determine whether there are entries containing the one or more identifiers of the document displayed in the navigation area result window 214.

Advertising Messages

Figure 7:
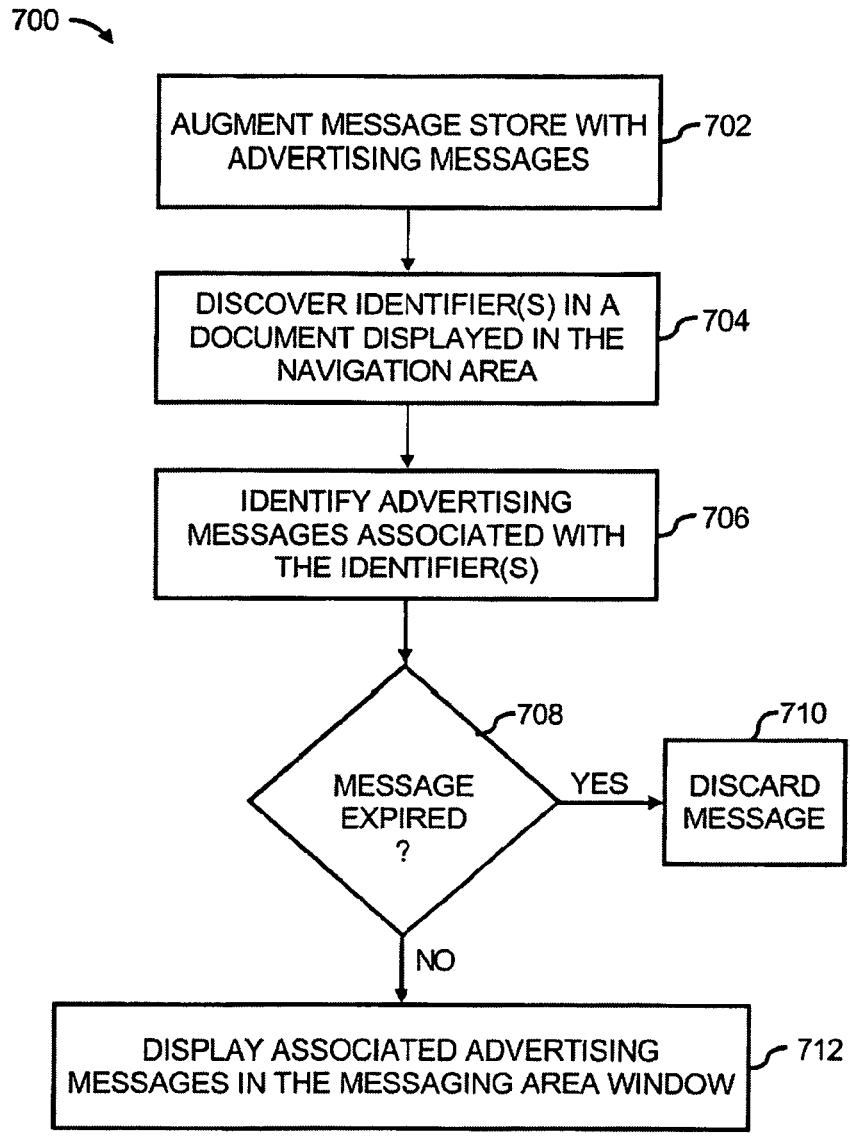
FIG. 7 shows a flow diagram of a method of automatically displaying advertising messages associated with content displayed in the navigation area window, according to an embodiment of the invention.

With reference now to FIG. 7, there is shown a flow diagram of a method 700 of automatically displaying advertising messages associated with content displayed in the navigation area window 210, according to an example. More particularly, the one or more processors may implement or execute the method 700 to automatically locate and send an advertising message to the user in response to the user receiving predetermined content in the navigation area window.

Generally speaking, the messaging area application 140 may implement the method 700 to deliver substantially focalized advertising to users depending upon the web pages they visit. By way of example, the advertisement may be delivered to the user in response to the user signing up with a mailing service designed to automatically deliver the advertisements from one or more advertising providers.

In addition, at step 702, the message store 150 may automatically be augmented with messages from an advertising repository (not shown). The advertising repository may include a plurality of different advertising messages that may be delivered to various message stores 150 based upon, for instance, various user activities. By way of example, the message store 150 may communicate with the advertising repository over the Internet and the advertising repository may periodically transmit advertising messages to the message store 150. Alternatively, however, step 702 may be omitted as the advertising messages may be delivered to the user directly from one or more advertising repositories, as described above in the Expanded Search section.

In any event, at step 704, the messaging area application 140 may discover one or more identifiers in a document displayed in the navigation area window 210. The messaging area application 140 may discover the one or more identifiers in any of the manners discussed above with respect to step 302 in FIG. 3.

At step 706, the messaging area application 140 identifies the advertising message associated with the one or more identifiers discovered at step 704 by scanning through the message store 150 or an advertising repository for the advertising content. Thus, for instance, if the identifier comprises the URL of the web page displayed on the navigation area result window 214, an advertising message may be stored in the message store 150 such that it is associated with that URL.

Additional information may also be stored with the advertising messages, for instance, as metadata. By way of example, the advertising messages may be tagged with expiration dates after which the advertising messages are to be discarded from the message store 150, as may be beneficial during a sales event. Thus, the messaging area application 140 may determine if the advertising message associated with the identifier(s) of the document displayed in the navigation area result window 214 has expired at step 708.

If the messaging area application 140 determines that the associated advertising message has expired, the messaging area application 140 may discard the message, as indicated at step 710. If, however, the messaging area application 140 determines that the associated advertising message has not expired, the messaging area application 140 may display in the associated advertising message in the messaging area window 220, as indicated at step 712.

Moreover, the advertising message displayed at step 712 may include an embedded link to a webpage that, when selected, may display a more detailed advertisement in the navigation area result window 214.

In addition to advertising messages, one or more of the messages stored in the message store 150 may be tagged with data concerning expiration dates. Thus, for instance, the messages may be tagged with dates indicating that the topics contained therein are no longer relevant following a particular date, such as, following a completion date of a particular project.

Tracking Metrics

The content of the message store 150 may be queried to create views over the messaging data which may not already be supported by the messaging application 110. For example, the frequency with which a particular identifier has been referred to in messages, or all the messages sent today which refer to a URL may be graphically displayed. This may be achieved by querying the message store 150 and using the results to generate a web page for display in the navigation area window 210.

Conclusion

Some or all of the operations set forth in the methods 300-700 may be contained as utilities, programs, or subprograms, in any desired computer accessible medium. In addition, some or all of the methods 300-700 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 8:
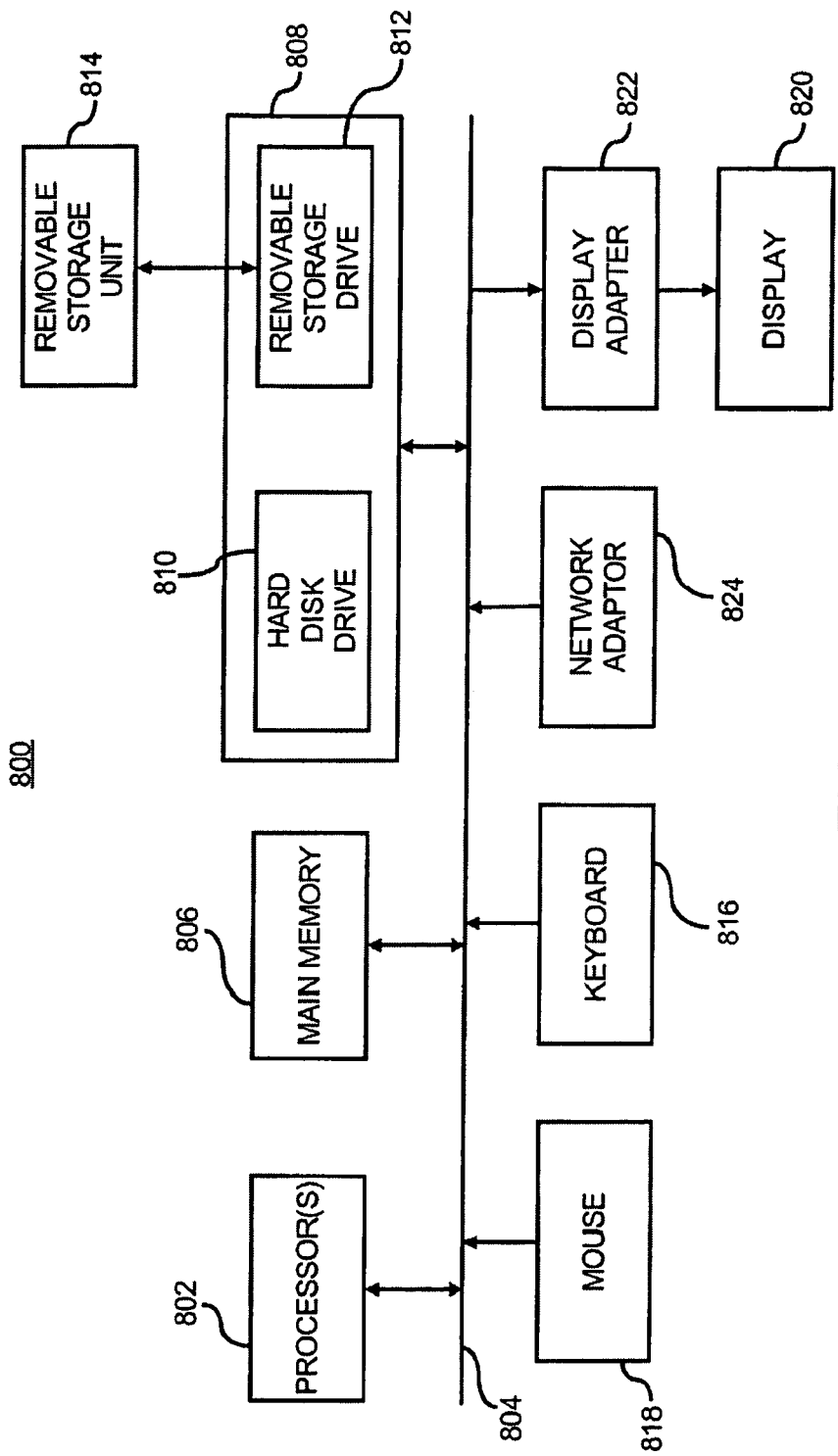
FIG. 8 shows a block diagram of a computing apparatus configured to implement one or more of the methods discussed with respect to FIGS. 3-7, according to an embodiment of the invention.

FIG. 8 illustrates a block diagram of a computing apparatus 800, such as the computing apparatus 102 depicted in FIG. 1, according to an example. In this respect, the computing apparatus 800 may be used as a platform for executing one or more of the functions described hereinabove with respect to the computing apparatus 102.

The computing apparatus 800 includes one or more processors 802. The processor(s) 802 may be used to execute some or all of the steps described in the methods 300-800. Commands and data from the processor(s) 802 are communicated over a communication bus 804. The computing apparatus 800 also includes a main memory 806, such as a random access memory (RAM), where the program code for the processor(s) 802, may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for the methods 300-800 may be stored.

The removable storage drive 810 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor(s) 802 and convert the display data into display commands for the display 820. In addition, the processor(s) 802 may communicate over a network, for instance, the Internet, LAN, etc., through a network adaptor 824.

It will be apparent to one of ordinary skill in the art that other known electronic components may be added or substituted in the computing apparatus 800. It should also be apparent that one or more of the components depicted in FIG. 8 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A computerized method of identifying and displaying messages, wherein the messages are privately stored in a message store for restricted access by a user, said method comprising:

displaying a document in a navigation area result window, said document having an identifier;

in response to the document being displayed in the navigation area result window, automatically discovering the identifier of the document by identifying at least one of a uniform resource identifier of the document and at least one of an object contained in the document and a section of the document;

scanning through the message store to identify messages containing message identifiers that match the identifier of the document displayed in the navigation area result window; and displaying the identified messages in a messaging area window, wherein the messaging area window is commonly displayed with the navigation area result window.

2. The method according to claim 1, further comprising:
at least one of storing and updating messages in the message store, wherein the messages comprise messages received by and sent from a messaging application.

3. The method according to claim 1, further comprising:
creating an index of the messages stored in the message store; and
wherein scanning through the message store further comprises scanning through the index for messages containing the identifier.

4. The method according to claim 1, wherein discovering the identifier of the document further comprises identifying fragment identifiers, wherein each of the fragment identifiers is associated with at least one of a respective object in the document and a segment of a video displayed in the document.

5. The method according to claim 1, further comprising:
actively monitoring the document to discover one or more additional identifiers in the document;
scanning through the message store to identify additional messages containing the one or more additional identifiers; and
displaying the additional messages identified as containing the one or more additional identifiers in the messaging area window.

6. The method according to claim 1, further comprising:
receiving a command to generate a new message;
opening a new message window; and
pre-populating the new message with the identifier of the document.

7. The method according to claim 1, further comprising:
receiving a selection of messages to be summarized;
receiving a command to summarize the messages;
combining the selected messages into a summarized message in the messaging application; and
displaying the summarized message in place of the selected messages in the messaging area window.

8. The method according to claim 1, further comprising:
determining an orientation of a computing apparatus configured to display the navigation area result window and the messaging area window; and
displaying one of the navigation area result window and the messaging area window depending upon the orientation of the computing apparatus.

9. The method according to claim 1, further comprising:
identifying one or more advertising messages associated with the identifier of the document displayed in the navigation area result window; and
displaying the associated one or more advertising messages in the messaging area window.

10. The method according to claim 9, further comprising:
augmenting the message store with advertising messages, wherein the advertising messages are associated with one or more identifiers, and wherein identifying the one or more advertising messages further comprises identifying the one or more advertising messages from the advertising messages stored in the message store.

11. The method according to claim 1, further comprising:
tagging one or more of the messages stored in the message store with an expiration date;

determining whether the messages identified as containing the identifier have been tagged with the expiration date;
determining whether the expiration date has expired; and
discarding the messages containing an expired expiration date.

12. The method according to claim 1, further comprising:
tracking metrics of the messages displayed in the messaging area window; and
displaying the tracked metrics in one of the navigation area result window and the messaging area window.

13. The method according to claim 1, wherein the identifiers contained in the messages displayed in the messaging area result window include hypertext links, the method further comprising:
in response to receipt of a command to activate a hypertext link contained in the message, displaying the document associated with the activated hypertext link in the navigation area window.

14. A computerized system for identifying and displaying messages in a computing apparatus, said system comprising:
a message store privately accessible by a user;
a messaging application plug-in for at least one of storing and updating messages sent from and received by a messaging application in the message store;
a messaging area application to automatically discover an identifier of a document displayed in a navigation area result window by identifying at least one of a uniform resource identifier of the document and at least one of an object contained in the document and a section of the document in response to the document being displayed in the navigation area result window, wherein the messaging area application is configured to scan through the message store to identify the messages containing message identifiers that match the identifier of the document displayed in a navigation area result window and to display the identified messages in a messaging area window; and
a processing unit to implement the message store, the messaging application plug-in, and the messaging area application.

15. The computerized system according to claim 14, wherein the navigation area result window is controlled by a navigation area application, and wherein the messaging area application comprises a plug-in to the navigation area application.

16. The computerized system according to claim 14, wherein the messaging area application is further configured to cause the messaging application to open a new message window that is pre-populated with the identifier from the document displayed in the navigation area result window.

17. The computerized system according to claim 14, wherein the messaging area application is further configured to cause the messaging application to summarize a plurality of selected messages to create a summarized message and wherein the messaging area application is further configured to replace the plurality of selected messages with the summarized message in the messaging area window.

18. The computerized system according to claim 14, wherein the computing apparatus comprises a mechanism for determining an orientation of the computing apparatus, and wherein the messaging area application is configured to display one of the navigation area window and the messaging area window depending upon the determined orientation of the computing apparatus.

19. The computer and system according to claim 14, wherein the messaging area application is further configured to identify one or more of advertising messages associated with the identifier of the document displayed in the navigation area window and to display the associated one or more advertising messages in the messaging area window.

20. A non-transitory computer readable storage medium on which is embedded one or more computer programs, said one or more computer programs implementing a method of identifying and displaying messages wherein the messages are privately stored in a message store for restricted access by a user, said one or more computer programs comprising a set of instructions for:
- at least one of storing and updating messages in the message store, wherein the messages comprise messages received by brand sent from a messaging application of the computing apparatus;
- automatically discovering an identifier of a document displayed in a navigation area result window by identifying at least one of a uniform resource identifier of the document and at least one of an object contained in the document and a section of the document in response to the document being displaced in the navigation area result window;
- scanning through the message store to identify messages containing message identifiers that match the identifier of the document displayed in the navigation area result window; and
- displaying the identified messages in a messaging area window.

* * * * *

UNITED STATES PATENT AND TRADEMARK OFFICE
CERTIFICATE OF CORRECTION

| | | |
|---|---|---|
| PATENT NO. | : 9,117,202 B2 | Page 1 of 1 |
| APPLICATION NO. | : 12/254979 | |
| DATED | : August 25, 2015 | |
| INVENTOR(S) | : Close et al. | |

It is certified that error appears in the above-identified patent and that said Letters Patent is hereby corrected as shown below:

In the claims

Column 14, line 65, Claim 19, delete "computer and system" and insert -- computerized system --, therefor.

Column 15, line 13, Claim 20, delete "by brand" and insert -- by and --, therefor.

Column 15, line 20, Claim 20, delete "displaced" and insert -- displayed --, therefor.

Signed and Sealed this
Nineteenth Day of April, 2016

Michelle K. Lee
*Director of the United States Patent and Trademark Office*